Sept. 29, 1970 R. P. MUTTICK 3,531,601

PHONOGRAPH PICKUP CARTRIDGE WITH SELECTIVELY SETTABLE COMPLIANCE

Filed June 26, 1968 2 Sheets-Sheet 1

INVENTOR.
RICHARD P. MUTICK

BY

OSTROLENK, FABER, GERB & SOFFEN
ATTORNEYS

INVENTOR.
RICHARD P. MUTICK
BY
OSTROLENK, FABER, GERB & SOFFEN
ATTORNEYS

United States Patent Office 3,531,601

Patented Sept. 29, 1970

3,531,601

PHONOGRAPH PICKUP CARTRIDGE WITH SELECTIVELY SETTABLE COMPLIANCE

Richard P. Muttick, Yorktown Heights, N.Y., assignor to Sonotone Corporation, Elmsford, N.Y., a corporation of New York Filed June 26, 1968, Ser. No. 740,210

Int. Cl. H04r *17/08;* G11b *3/02*

U.S. Cl. 179—100.41 9 Claims

ABSTRACT OF THE DISCLOSURE

A transducer-carrying structure with at least one stylus-driven mechano-electric transducer and its stylus coupler—is movable to a plurality of position-settings longitudinally displaced along a guideway of the cartridge structure carried at a fixed position by the tone arm. The cartridge structure carries the stylus in the same fixed stylus-set-down dimension and with the same fixed stylus-mounting-dimension in each of the different position-settings of the transducer-carrying structure or tone-arm for operating with a corresponding selected different compliance or sensitivity setting.

This invention relates to phonograph pickup or cartridges, and more particularly to a phonograph cartridge operable with a selectively adjustable transducer sensitivity and compliance.

In the design of a stereophonic cartridge it is essential to assure that the position of the stylus tip or point shall be fixed with respect to the cartridge mounting connection with the cartridge carrier such as tone arm. As an example, and for the purposes of this specification and claims, this fixed relation of the stylus tip of the cartridge to its mounting connection to the cartridge carrier or tone arm is herein designated and called the "cartridge mounting dimension." Such fixed relation of the stylus tip to the cartridge-mounting connection with the tone arm is usually maintained by controlling the stylus setdown dimension and the stylus mounting dimension of the cartridge.

As used herein in the specification and claims the following expressions are defined as follows:

The expression "stylus setdown dimension" of a phonograph cartridge is usually and herein defined as the distance between the groove engaging stylus tip or point to the line passing through approximately the center of and normal to the plane containing the mounting surface of the cartridge or its bracket. In addition, the expression "stylus mounting dimension" is therein similarly defined as the perpendicular or normal dimension of height from the plane containing the cartridge mounting surface or bracket to the stylus point.

Among the objects of the invention is a phonograph pickup cartridge which enables selective adjustment or setting of its operative sensitivity and compliance to different selected values while maintaining the same fixed stylus setdown dimension and the same stylus mounting dimension of the cartridge in each such different sensitivity and compliance setting. Such cartridge wherein the different sensitivity settings are secured with a minimum of extra components can be adjusted after completion of the cartridge assembly.

A further obect of the invention is replacement of the heretofore required selection—from a plurality of cartridges having different sensitivities or compliances—of the one having the desired specific sensitivity or compliance by a single cartridge operable with a plurality of different sensitivity and compliance settings.

In accordance with the invention, a two-section or two-part phonograph cartridge is provided. One cartridge part—herein designated "Transducer mounting structure" or abbreviated "Transducer mount" carries operatively assembled therein the mechanoelectric transducer(s) and associated elements including the transducer-to-stylus coupler extending from a movable element of the transducer (or transducers). The other cartridge part—herein designated "Cartridge mounting structure" or "Cartridge mount"—is attachable to the tone arm or cartridge carrier and carries operatively assembled therein the stylus or stylus rod with its support and is arranged to operatively secure the transducer mounting structure at one of a plurality of different selected sensitivity and compliance settings at which the transducer coupler engages a selected different longitudinal portion of the stylus rod. The cartridge mounting structure cooperates with the transducer-mounting structure of the cartridge in each of these different sensitivity/compliance settings. Such full cooperation between the cartridge mounting structure and the transducer mounting structure is obtained in each of these different sensitivity/compliance settings which may be even continuously variable while securing in each of them the same fixed stylus-setdown dimension and the same fixed stylus mounting dimension of the cartridge.

In accordance with the invention, the transducer mounting structure or transducer mount has a plurality of different mounting-position settings longitudinally displaced from each other along a guide path or guideway of the cartridge mounting structure extending generally parallel to the axis of the stylus rod. This arrangement enables coupling of the transducer at selected different portions of the stylus rod while securing the same fixed stylus setdown dimension and the same fixed stylus mounting dimensions in each of the different sensitivity and compliance settings.

In other words, the cartridge of the invention is selectively settable to operate with one of several different sensitivity and compliance settings, in each of which it has substantially the same fixed cartridge stylus setdown dimension and the same fixed stylus mounting dimension.

The foregoing and other objects and features of the invention will become apparent from the following description in conjunction with the accompanying drawings wherein.

Figure 7:
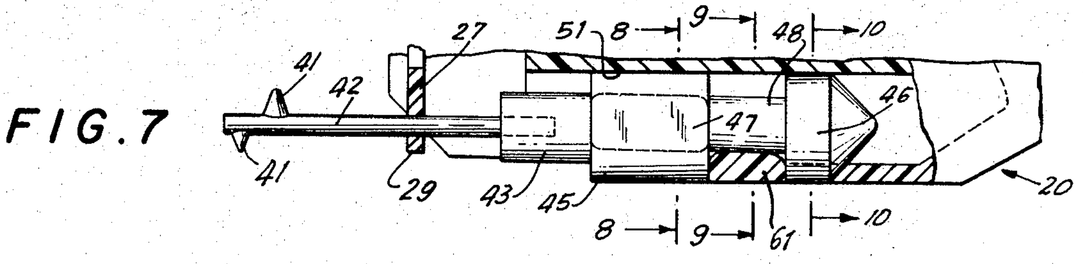
Figure 8:
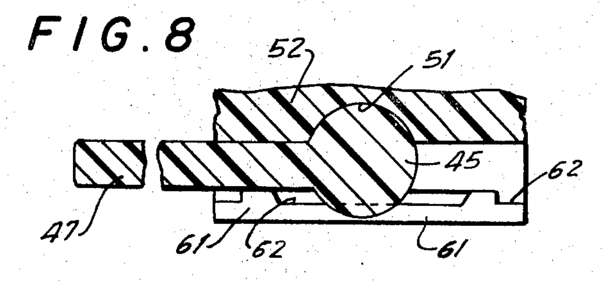
Figure 9:
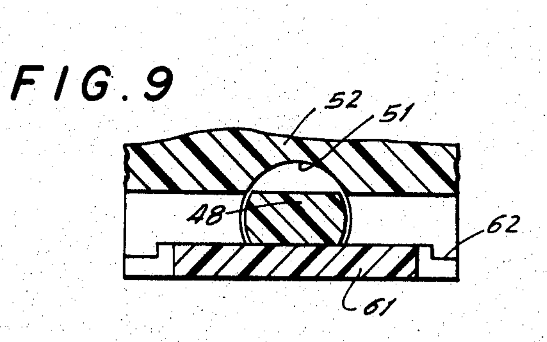
Figure 10:
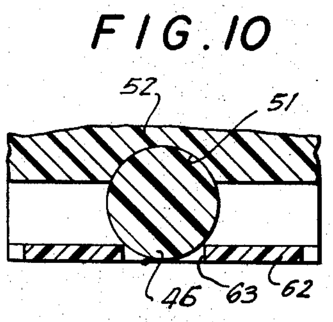

FIG. 7 is a cross-section of the central bottom portion of the transducer mount with stylus rod and associated parts held seated by cooperating portions of the cartridge mount; and FIGS. 8, 9, and 10 are cross-sections along lines 8—8, 9—9, and 10—10 of FIG. 7, respectively.

Referring to FIGS. 1 to 7, a stereophonic cartridge 10 comprises a transducer mounting structure or transducer mount 20 and a cartridge mount part or structure 30. The transducer mounting structure or transducer mount 20 comprises a housing 21 within which are positioned two beam type transducer elements 22. The transducer elements 22 may be conventional piezoelectric ceramic beam elements which generate electric signal output when flexed, with the output or sensitivity increasing with their flexure.

The rearward portion 24 of each transducer element 22 is positioned in and clamped by conventional elastomer pad 26 within the elongated mounting compartment of the surrounding relatively rigid housing 21. The transducer elements 22 carry at their other movable ends a motion-resolving coupler or resolver 27. Connections to the conventional amplifier are provided by electric contact pairs 25 which may be clamped by pad 26 to exterior metallic electrode surfaces of each transducer 22. The mounting of the two transducers 22 in the transducer compartments of transducer mounting structure 20 and the V-shaped resolver 27 is well known in the art, and is similar to those described in copending application Ser. No. 616,277, filed Feb. 27, 1967, by J. F. Collins et al. to which reference is made for more detailed description.

The V-shaped resolver 27 has two arms each with a coupler end 28 affixed to the free end of the respective transducer beam 22 for driving it with a resolved motion component of the groove-imparted stereophonic stylus motion. (See U.S. Pat. No. 3,236,956 of Kantrowitz and above identified application Ser. No. 616,277.) At its bottom center—as seen in FIGS. 1, 2, 3, 5, and 7—the V-type resolver 27 has a coupling end 29 shown formed with a coupling groove which engages and is driven by the below described stylus rod 42 for transmitting a resolved stereophonic motion component corresponding to the stereophonic record-groove undulations. The two arms 27L, 27R of resolver 27 resolve the stereophonic stylus motion into its two distinct components each of which is transmitted by the respective resolver arm 27L, 27R (FIG. 3) to its respective transducer 22 and causes it to supply a corresponding signal output through its terminals 25 to the associated amplifier circuit.

Referring to FIGS. 1 to 6, the fixed cartridge mount 30 has an interior elongated axial guideway 31 holding and longitudinally guiding therein the elongated transducer mount 20 with its two transducers 22, their coupler-resolver 27 and their associated parts. The axis of the fixed guideway 31 is generally parallel to the axis of the stylus rod 42 carrying the stylus 41, and its elongated stylus-seating member 45, 46. The rear end of stylus rod 42 is held by the front part of an elastomer body 43 having a rear part fixed to a substantial rigid elongated seating section 45 which is joined to a rear seating section 46 by a rigid intermediate seating section 48.

The groove imparted stylus undulations are transmitted by stylus rod 42 to the V-type resolver 27. The two arms of resolver 27 transmit the proper resolved stylus-motion components to the two distinct transducer beams 22 which supply corresponding signal outputs to their respective output circuits.

In accordance with the invention, the fixed cartridge mount 30 serves to retain the stylus (or styli) 41 of a detachable stylus holder unit 40 in a predetermined fixed position and at a predetermined height relative to the tone arm. The stylus 41 is carried at the front end of stylus rod 42, the rear end of which is flexibly connected by an elastomer body 43 held in the front end of an elongated rigid seating member 45 of the stylus holder 40 (FIGS. 1 to 5, and 7 to 10). Such stylus holder is fully described in U.S. Pat. No. 3,236,956 of Kantrowitz. In the specific stylus holder 40 shown, the rigid stylus holder seating member 45 has a cylindrical rear section 46 of the same cylindrical shape as the front members, both of which are rotatable on a cylindrical seating surface 51 at the center of bottom wall 52 of transducer mounting structure 20. A handle 47 which extends laterally from cylindrical seating member 45 serves to rotate the cylindrical seating portions 45, 46 on seating surface 51 for bringing either one of the two styli 41 into a groove-engaging position.

Figure 1:
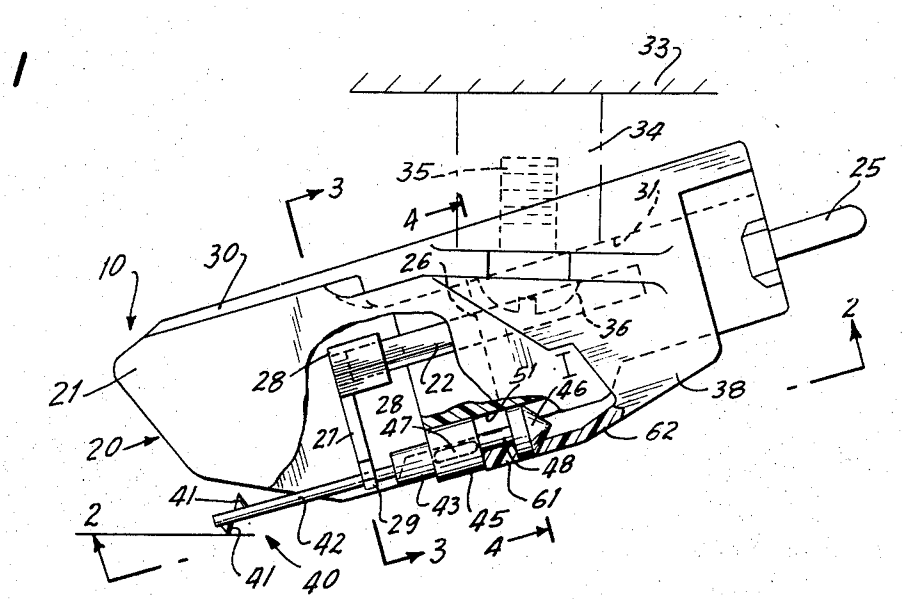
FIG. 1 is an elevation, partially in cross-section of a phonograph cartridge exemplifying the invention as it is mounted on a tone arm along a record surface.
Figures 2, 3, 4:
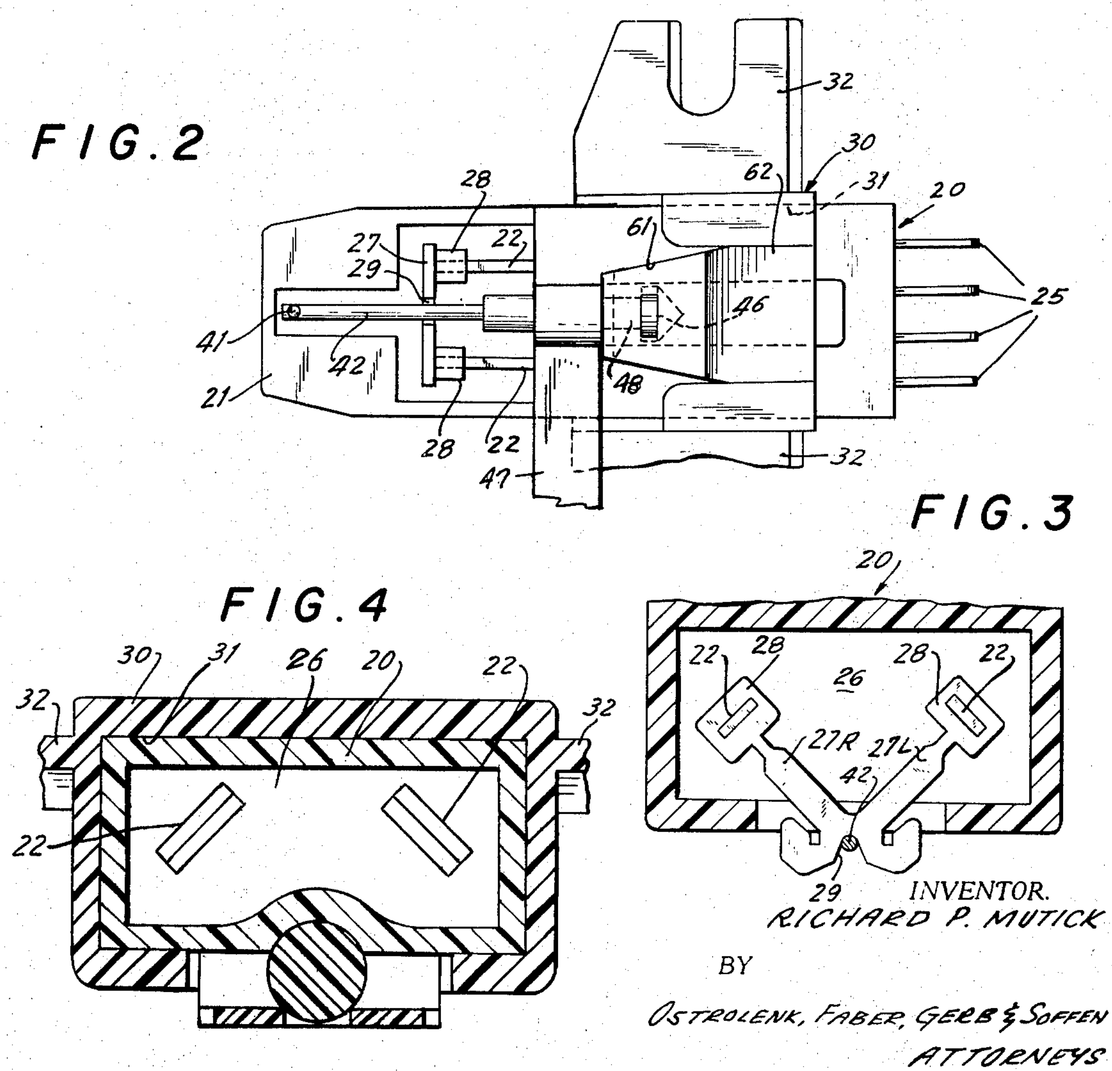
FIG. 2 is a plan view along lines 2—2 of FIG. 1.
FIG. 3 is a cross-section along lines 3—3 of FIG. 1.
FIG. 4 is a cross-section along lines 4—4 of FIG. 1.
Figures 5, 6:
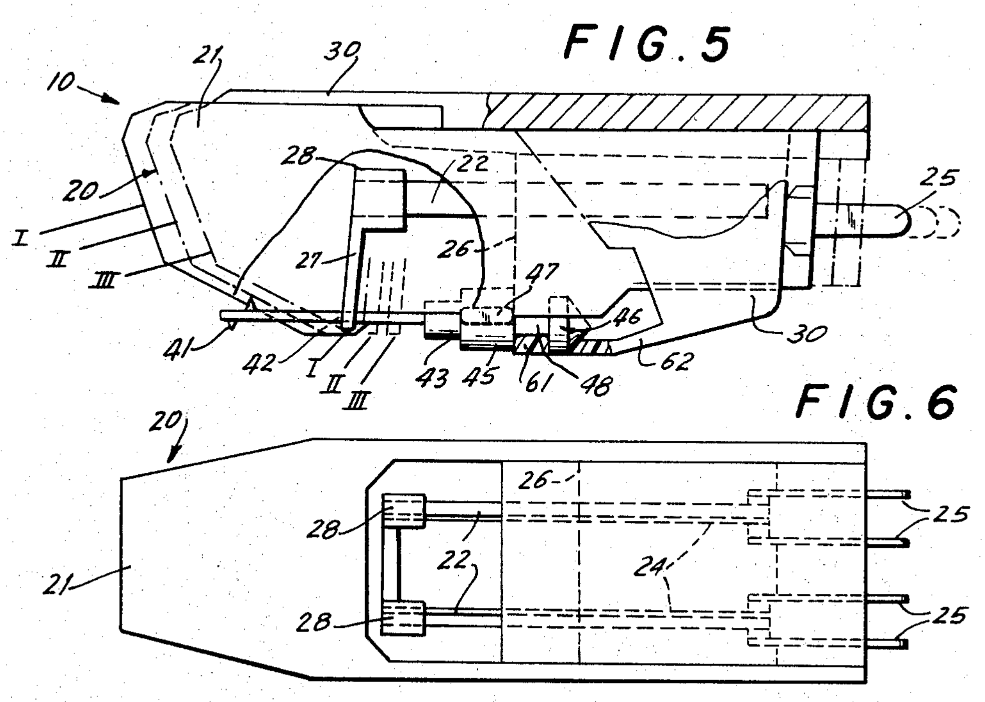
FIG. 5 is an elevation similar to FIG. 1 of the same cartridge, showing different settings of its movable transducer mounting structure.
FIG. 6 is a top view of the transducer mounting structure only.

Between the two cylindrical sections 45, 46 of the rigid stylus holder seating member is interposed a flat rigid junction section 48 which is held in the horizontal position of FIGS. 1, 3, 4, 5 and 7 to 9, by the end portion 61 of a retainer spring or arm 62 extending from the rear end 38 of cartridge mount 30 (FIGS. 1, 5, 7). This retainer spring 62 is shown as an integrally molded part of tone arm mount 30, but may be formed of metal spring extending from cartridge mount 30, similar, for instance, to the analogous metallic stylus holder retainer spring of U.S. Pat. No. 2,717,929 (Klingener). Alternatively, the stylus rod 42 may be of any other known type, for instance, such as described in U.S. Pat. No. 2,825,762 having its rear end detachably or permanently affixed to a rear portion of the cartridge mount 30.

The compliance of each distinct transducer beam system is measured at the tip or point of the stylus 41 and depends on the compliance of the stylus 41, the stylus rod 42 with its elastomer link 43, the resolver arms 27 and the two transducers 22 and their elastomer pads 26 and the compliance of all their other associated elements. A compliance change of any such elements will affect the compliance of the assembly. Assuming that the compliance of all these cartridge elecents is constant, the overall cartridge compliance depends on the engagement-position at which the stylus rod 42 engages the resolver 27 which position fixes the motion amplitude transmitted by the stylus rod 42 to the resolver 27, and therethrough to the transducers 22.

In accordance with the invention, the transducer mounting structure 20 forms a distinct self-supporting unit carrying in proper operative position the transducer beam or beams 22 and their couplers 27 for coupling the respective transducer 22 to a portion of the stylus rod 42. The transducer mounting structure 20 is shown continuously guided by the fixed cartridge mount 30 along a guideway 31 thereof to a plurality of longitudinally displaced positions or settings thereof and thereby to selected different overall compliance positions in the respective different positions of the transducer mount settings, such as shown in FIG. 5 by the longitudinally displaced settings I, II, and III of the transducer coupler 27.

In each of such different longitudinal settings of the transducer mounting structure 20, its transducer resolver 27 engages with its coupling end different longitudinally displaced portions of stylus rod 42 which are at different distances from the stylus. As an example, with the resolver 27 held in position I, the resolver coupling end 29 is nearest to the stylus 41 with the stylus rod 42 driving the coupler 27 to greater amplitude thereby increasing the sensitivity and lowering the compliance of the cartridge.

On moving the transducer mounting structure 20 to the next more rearward position indicated by position II of resolver 27 (FIG. 5) the resolver coupling end 29 is farther away from the stylus 41 with the stylus rod 42 driving the resolver 27 with a reduced amplitude and transducer sensitivity and a correspondingly increased compliance. On further rearward motion of transducer mounting structure 20 to the resolver position III (FIG. 5), revolver coupling end 29 is still farther away from the stylus 41, with the stylus rod 42 driving the resolver 27 with a still more reduced amplitude and a corresponding lower sensitivity and increased compliance.

The guideway 31 of the cartridge mount 30 along which the transducer mounting structure 20 moves has a longitudinal axis generally parallel to the elongated stylus rod 42 and its elongated seating member 45, 46. The bottom wall of the movable transducer mounting structure 20 has a central elongated guide surface 51 (FIGS. 1, 2, 4, 5 and 7 to 10) along which the fixedly held stylus-holder seating sections 45, 46 slide to different longitudinal portions thereof, corresponding to the different longitudinal setting positions I, II, III, etc., of the transducer mounting structure 20 in the guideway 31 of the cartridge mount 30. However, at all such changes to different settings of compliance and sensitivity of the cartridge, the stylus 41 does not move because in each of such different compliance settings of the transducer mounting structure 20, the stylus holder 40 with seating sections 45, 46 is held in fixed position by engagement of its recessed section 48 with the retainer end portion or tooth 61 of spring arm 62 of the cartridge mount 30. Accordingly, the cartridge 10 will retain the same fixed stylus setdown dimension and the same fixed stylus mounting dimension in all the different compliance settings thereof.

In the specific form shown, the retainer spring arm 62 has an opening 63 which captures or fixes the position of the wider rear section 46 of the stylus holder seating member. This spring arm opening 63 serves to maintain the stylus rod assembly 40 in fixed position with respect to the cartridge mounting structure 30, while the transducer mounting structure 20 is moved to the different compliance or amplitude settings such as I, II, III, indicated in FIG. 5.

In the above described example of a cartridge 10 of the invention, the cartridge mounting structure 30, which is held affixed to the tone arm, has an elongated guideway 31 along which the transducer mounting structure 20 (FIG. 5) with its transducers 22 is movable to different selected amplitudes or compliance settings such as I, II, III described above (FIGS. 1 to 5). In each of these different selected compliance settings, the transducer coupler element or resolver 27 is coupled to a different longitudinal portion of the stylus rod 42, thereby transmitting the stylus motion with a corresponding different amplitude setting. The elongated guideway 31 of the cartridge mount 30 extends generally parallel to the coupling axis along which the stylus rod 42 is maintained in coupling engagement with the transducer coupler or resolver 27. There is provided a sufficiently long hollow central guide space on the underside of the transducer mounting structure 20 against which stylus-holder seating member sections 45, 46 are retained by the retainer spring 62 of the fixed cartridge mount 30 as the transducer mounting structure 20 is moved past the stylus rod seating member 45, 46 to the different amplitude settings, such as amplitude settings I, II, III described above.

For the sake of conciseness, the figures do not show that in the particular form shown the transducer mounting structure 20 could be made of two plastic parts suitably affixed to each other, as by rivets analogous to the cartridge housing of application Ser. No. 616,276 filed Feb. 15, 1967, now Pat. No. 3,475,565, by J. F. Collins et al.

An example of a phonograph cartridge of the invention has just been described, the sensitivity and compliance of which can be readily adjusted to different compliance or sensitivity settings after the completion of the manufacture of the cartridge while securing the same fixed stylus-setdown and stylus mounting dimension in each of the different settings. Such adjustable compliance cartridge can be formed with a minimum of extra components.

The described examples of variable sensitivity or compliance pickup cartridges will suggest various modifications of the invention. Therefore, the claims shall not be limited to the specific disclosure herein.

The embodiments of the invention in which an exclusive privilege or property is claimed are defined as follows:

1. In a phonograph cartridge carried on a carrier with a predetermined fixed stylus setdown dimension and with a predetermined fixed stylus mounting dimension;

a stylus holder comprising an elongated stylus rod carrying at one end a groove-undulated stylus point and a rod support at the opposite rod end;

at least one mechanoelectric transducer and a transducer coupler extending from one end of said transducer having a coupler end shaped for coupling engagement with a portion of said stylus rod for transmitting the stylus motion to said transducer;

a cartridge mounting structure having a mounting portion affixable to the carrier and a further portion carrying and fixing the position of said stylus rod and said stylus point;

a transducer mounting structure operatively carrying said transducer and its said coupler;

the improvement comprising;

said cartridge mounting structure having an elongated guideway extending generally parallel to said stylus rod;

said transducer mounting structure having an elongated guided portion engaging and guided by said guideway to a plurality of at least two different longitudinally displaced positions with said transducer coupler end engaging corresponding longitudinally displaced portions of said stylus rod;

in which the compliance at said stylus point is selectively set at predetermined different compliance settings, with said cartridge held with the same fixed stylus setdown dimension and the same fixed stylus mounting dimension in each of all said different compliance settings.

2. In a phonograph cartridge as claimed in claim 1, said cartridge mounting structure having substantially rigid wall portions constituting said guideway;

said transducer mounting structure having substantially rigid wall portions constituting said guided portions, said coupler end engaging a different longitudinal portion of said stylus rod in said different compliance settings of said transducer mounting structure, said guideway of said cartridge mounting structure being shaped to continuously guide said transducer mounting structure to different longitudinally displaced positions in each of which said cartridge will operate with a different one of said compliance settings.

3. In a phonograph cartridge as claimed in claim 1, said cartridge mounting structure having substantially rigid wall portions constituting said guideway;

said transducer mounting structure having substantially rigid wall portions constituting said guided portions.

4. In a phonograph cartridge as claimed in claim 3, said guideway of said cartridge mounting structure having at least two longitudinally displaced positions in each of which said transducer mounting structure can be positioned for operation with a different one of said compliance settings.

5. In a stereophonic phonograph cartridge carried on a cartridge carrier with a predetermined fixed stylus setdown dimension and with a predetermined fixed stylus mounting dimension;

a stylus holder comprising an elongated stylus rod carrying at one end a groove-undulated stylus point and a rod support at the opposite rod end;

two elongated vibratory mechanoelectric transducers;

a transducer mounting structure operatively carrying said transducers;

each transducer having a driven transducer portion, a motion resolving coupler having a coupler end engageable with a portion of said stylus rod and two divergent coupler arms, each having an arm end connected to a different one of said driven transducer portions for driving the different of said two transducers with a distinct stereophonic component of the stylus motion;

said cartridge mounting structure having a mounting portion affixable to the cartridge carrier and a further portion carrying and fixing the position of said stylus rod and of said stylus point;

the improvement comprising;

said cartridge mounting structure having an elongated guideway extending generally parallel to said stylus rod;

said transducer mounting structure having an elongated guided portion engaging and guided by said guideway to a plurality of at least two different longitudinally displaced positions with said transducer coupler end engaging corresponding longitudinally displaced different portions of said stylus rod, in which the compliance at said stylus point is selectively set at a predetermined different compliance setting;

with said cartridge held with the same fixed stylus setdown dimension and the same fixed stylus mounting dimension in each of said different compliance settings,

6. In a phonograph cartridge as claimed in claim 5, said cartridge mounting structure having substantially rigid wall portions constituting said guideway;

said transducer mounting structure having substantially rigid wall portions constituting said guided portions.

7. In a phonograph cartridge as claimed in claim 5, said guideway of said cartridge mounting structure having at least two longitudinally displaced positions in each of which said transducer mounting structure will operate with a different one of said compliance settings.

8. In a phonograph cartridge as claimed in claim 5, said cartridge mounting structure having substantially rigid interior recessed wall portions constituting said guideway;

said transducer mounting structure having substantially rigid exterior wall portions constituting said guided portions, said coupler end engaging a different longitudinal portion of said stylus rod in said different compliance settings of said transducer mounting structure, said guideway of said cartridge mounting structure having at least two longitudinally displaced positions in each of which said transducer mounting structure will operate with a different one of said compliance settings.

9. In a phonograph cartridge as claimed in claim 5, said cartridge mounting structure having substantially rigid interior recessed wall portions constituting said guideway;

said transducer mounting structure having substantially rigid exterior wall portions constituting said guided portions, said coupler end engaging a different longitudinal portion of said stylus rod in said different compliance settings of said transducer mounting structure, said guideway of said cartridge mounting structure being shaped to continuously guide said transducer mounting structure to different longitudinally displaced positions in each of which said cartridge will operate with a corresponding different one of said compliance settings.

References Cited

UNITED STATES PATENTS

| | | | |
|---|---|---|---|
| 1,663,884 | 3/1928 | Harrison | 179—100.41 |
| 2,549,757 | 4/1951 | Corbett | 179—100.41 |
| 2,962,290 | 11/1960 | Gunter et al. | 179—100.41 |
| 3,075,054 | 1/1963 | Cvetko | 179—100.41 |
| 3,420,534 | 1/1969 | Miller | 274—37 |
| 3,482,061 | 12/1969 | Grado | 179—100.41 |

BERNARD KONICK, Primary Examiner

R. F. CARDILLO, Jr., Assistant Examiner

U.S. Cl. X.R.

274—37